United States Patent
Adams et al.

(10) Patent No.: US 6,200,915 B1
(45) Date of Patent: Mar. 13, 2001

(54) SILICONE COATED TEXTILE FABRICS

(75) Inventors: Graham Adams, Cardiff; Graham Budden, Cowbridge; David Lawson, Cardiff, all of (GB)

(73) Assignee: Dow Corning Ltd, Barry Wales (GB)

( * ) Notice: Subject to any disclaimer, the term of this patent is extended or adjusted under 35 U.S.C. 154(b) by 0 days.

(21) Appl. No.: 09/298,025

(22) Filed: Apr. 22, 1999

(51) Int. Cl.7 .................. B32B 27/12; B32B 5/02
(52) U.S. Cl. .................. 442/157; 442/71; 442/81; 442/97; 442/99; 442/134; 442/136; 280/728.1; 425/27; 425/35; 425/43; 428/35.7; 428/36.1; 428/36.6; 428/36.7
(58) Field of Search ................ 442/81, 97, 99, 442/134, 136, 157, 71; 425/27, 35, 43; 280/728.1; 428/35.7, 36.1, 36.6, 36.7

(56) References Cited

U.S. PATENT DOCUMENTS

| | | | |
|---|---|---|---|
| 2,823,218 | 2/1958 | Speier et al. | 260/448.2 |
| 3,419,593 | 12/1968 | Willing | 260/448.2 |
| 3,455,877 | 7/1969 | Plueddemann | 260/46.5 |
| 4,082,726 | 4/1978 | Mine et al. | 260/46.5 |
| 4,585,610 | 4/1986 | Fey et al. | 428/319.3 |

FOREIGN PATENT DOCUMENTS

| | | |
|---|---|---|
| 150 385 | 12/1984 | (EP) . |
| 535 649 | 9/1992 | (EP) . |
| 536 723 | 10/1992 | (EP) . |
| 552 983 | 1/1993 | (EP) . |
| 553 840 | 1/1993 | (EP) . |
| 646 672 | 8/1994 | (EP) . |
| 633 468 | 12/1994 | (EP) . |
| 669 419 | 2/1995 | (EP) . |
| 681 014 | 4/1995 | (EP) . |
| 712 956 | 10/1995 | (EP) . |
| 95-207794 | of 0000 | (JP) . |

*Primary Examiner*—Terrel Morris
*Assistant Examiner*—Arti Singh
(74) *Attorney, Agent, or Firm*—Jennifer S. Warren

(57) ABSTRACT

A textile fabric which has been coated with an elastomer-forming silicone-based composition, comprising an organopolysiloxane polymer having a siloxane backbone being end-blocked with at least two silicon-bonded reactive groups, preferably alkenyl, a cross-linking organosilicon material having at least 3 silicon-bonded reactive groups, preferably SiH, a catalyst, a first reinforcing filler, preferably silica or a silicone resin, and at least 2 parts by weight for every part of the first filler, of a second substantially laminar filler, preferably talc, pyrophillite, vermiculite, smectite or mica. The coated fabric may have among other benefits, a lower friction value and limiting oxygen index. Fabrics are specifically useful for inflatable safety restraints.

15 Claims, No Drawings

SILICONE COATED TEXTILE FABRICS

This invention is concerned with textile fabrics coated with silicone-based coating compositions. More particularly the invention is concerned with textile fabrics which are coated with silicone-based coating compositions capable of maintaining a pressure barrier between two areas with a pressure differential. The invention also relates to a process of preparing such textile fabrics and to textile articles, e.g. airbags made with coated textile fabrics.

Coating textile fabrics with silicone-based coating compositions has been know for a while. These compositions may impart a variety of benefits to the coated fabric. For example in EP 553,840, there is described a liquid silicone rubber coating composition for application to airbags in automobiles, which comprises a certain polydiorganosiloxane having alkenyl groups, an polyorganosiloxane resin, an inorganic filler, a certain polyorganohydrosiloxane, a platinum group metal catalyst and an epoxy group-containing organosilicon compound. In EP 646,672, there is described a fabric impregnated with a silicone composition comprising a certain linear polyorganosiloxane having aliphatic unsaturation, a certain polyorganohydrosiloxane, a catalyst promoting addition reaction, a hydrophobic silica, a flame retardant and optionally an adhesion promoting agent. The latter patent specification suggests the use of the composition for fabrics used in the construction of airbags.

The benefit of using silicone-coated compositions over other, e.g. organic coating compositions, lies e.g. in the improved weatherability, ability to maintain flexibility and heat resistance of the silicone-based composition. Although the prior art provides several systems which are satisfactory in many ways, there is a desire to improve the coating compositions used for making coated textile fabrics.

It is often desirable to provide coated textile fabrics with a finish which is relatively smooth. It is particularly desirable that textile fabrics which are intended for use in applications where they are subject to a certain amount of undesired friction have a smooth surface, i.e. a surface with a relatively low coefficient of friction. A particular example relates to the use of coated textile fabrics in the manufacture of airbags for use in automobiles. When such airbags are deployed, due to the use of an explosive charge, friction is inevitable. Such friction takes place where textile rubs over textile, and also where textile comes into contact with the interior of the automobile or a driver or passenger in an automobile during or after deployment. The amount of friction created can in some circumstances slow down the deployment of the airbag or cause burns to the skin of the driver or passenger. There is a desire to provide coated textile fabrics which have a relatively low coefficient of friction.

In other instances there is a desire to reduce the coating thickness, e.g. to minimise the weight of the coated fabric, whilst maintaining good physical properties, for example adequate coverage of the fabric surface by the coating, good adhesion to the textile fabric, ease of application of the coating to the textile fabric. At other times it is important to achieve an improved level of gas impermeability, especially where the textile fabric is to be used as an envelope for pressurised gas, e.g. as an automotive airbag, whilst maintaining good flexibility and a relatively low weight. There is often also a desire to improve the flame retardancy of coated textile fabrics. At other times it may be important that the textile fabric is particularly resistant against impact of very hot particles or the effect of hot gases. This latter property is again one which may be desired in the manufacture of airbags for automobiles, as an explosive charge is often used to inflate the airbag upon impact. Said explosive charges produce at times extremely hot particles, which may be thrown against the textile fabric. It is extremely important for safety and efficiency purposes that such particles do not cause a hole to be burnt through the envelope of the airbag.

EP 0712956 describes a coating composition for a rubber-coated fabric, comprising a rubber coating composition which comprises a rubber component and a specific solvent and added thereto a powder of an inorganic compound or an organic compound having an average particle size of from 0.5 to 20 $\mu$m, preferably at 20 to 50 parts by weight per 100 parts of the rubber component. The coating composition is said to improve the feeling of a rubber coated film by eliminating the sticky feeling of the rubber coated film itself. Examples of the inorganic or organic powders are aluminium hydroxide, mica, polymethyl-sylsesquioxane, carbon, polyamide and polyfluoroethylene. Preferred powders are spherical, as a flaky powder is said to be liable to weaken the rubber properties. Particles with an average size over 20 $\mu$m are stated as giving a poor coating property. The presence of a solvent is indicated to be very important, as it has a function of uniformly spreading the powder. Solvents are however, preferably avoided in the coating industry in general.

EP 150385 describes a method of imparting improved tear strength and flame retardancy to a base fabric material comprising applying to at least one side of said base fabric a base silicone coating composition containing an amount of non-abrasive filler effective for imparting said properties. The main application in mind is one of architectural fabric where translucency or transparency of the coating is important. Exemplified coating compositions use about 40 parts of the non-abrasive filler (preferably being calcium carbonate or hydrated alumina), per 100 parts of a siloxane polymer. Excessive viscosities, e.g. obtained if fumed silica or another reinforcing non-abrasive filler is incorporated, are handled by dilution with solvents.

We have now found that if a mixture of certain filler particles are used in elastomer-forming silicone compositions used for coating textile fabrics, one or more of the above mentioned needs for improvement can be met, even in the absence of a solvent.

According to the invention there is provided a textile fabric which has been coated with an elastomer-forming silicone-based composition, comprising A. an organopolysiloxane polymer having a siloxane backbone being end-blocked with at least two silicon-bonded groups R, wherein R denotes an olefinically unsaturated hydrocarbon substituent, an alkoxy group or a hydroxyl group, B. a cross-linking organosilicon material having at least 3 silicon-bonded reactive groups, C. a catalyst capable of promoting the reaction between the silicon-bonded groups R of compound A and the silicon-bonded reactive group of compound B, D. a first filler which is a reinforcing filler for the silicone-based composition E. at least 2 parts by weight for every part of the first filler, of a second filler, which has a substantially laminar form.

The elastomer-forming silicone based composition is able to form elastomers upon curing. Many organosiloxane systems are known and commercially available and many have been described in the literature which can be used to prepare such compositions.

Useful organopolysiloxane polymers (A) for use in elastomer-forming silicone based compositions have units of the general formula $R^1_a R^2_b SiO_{4-a-b/2}$ (I), wherein $R^1$ is a monovalent hydrocarbon group having up to 18 carbon atoms, $R^2$ is a monovalent hydrocarbon or hydrocarbonoxy group or a hydroxyl group, a and b have a value of from 0 to 3, the sum of a+b being no more than 3. Preferably the organopolysiloxane polymers have a generally linear nature having the general structure II

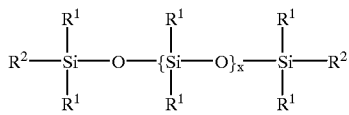
(II)

wherein $R^1$ and $R^2$ have the same meaning as above, and wherein x is an integer, preferably having a value of from 10 to 1500. It is particularly preferred that $R^1$ denotes an alkyl or aryl group having from 1 to 8 carbon atoms, e.g. methyl, ethyl, propyl, isobutyl, hexyl, phenyl or octyl. More preferably at least 50% of all $R^1$ groups are methyl groups, most preferably substantially all $R^1$ groups are methyl groups. $R^2$ is preferably selected from a hydroxyl group, an alkoxy group or an aliphatically unsaturated hydrocarbon group. More preferably $R^2$ denotes either a hydroxyl group or alkoxy group having up to 3 carbon atoms suitable for condensation reactions, or an alkenyl or alkynyl group having up to 6 carbon atoms, more preferably vinyl, allyl or hexenyl, suitable for addition reactions.

Preferably the organopolysiloxane polymers (A) have at least two silicon-bonded alkenyl groups per molecule. Such polymers are well known in the art and may vary from viscous materials to freely flowing liquids. Preferred materials have a viscosity of not greater than 250 Pa.s. at 25° C., more preferably 0.1 to 100 Pa.s. at 25° C. Although these alkenyl-substituted polymers (A) are preferably as described above under structure (II), they may be homopolymers, copolymers or mixtures thereof which comprise units of the general formula $R^1_a R^3_b SiO_{4-a-b/2}$ wherein $R^1$ and a are as described above, $R^3$ is an alkenyl group having up to 8 carbon atoms and b is 0 or 1 provided that a+b is not greater than 3.

More preferably organopolysiloxane (A) is a polydiorganosiloxane having the general formula (III),

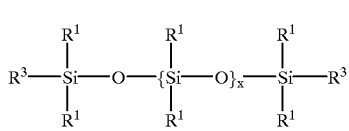
(III)

where $R^1$ is as defined above, $R^3$ denotes an alkenyl group having up to 8 carbon atoms, with the formula —$R^4_y$—CH=CH$_2$, where $R^4$ denotes a divalent hydrocarbon group having up to 6 carbon atoms, preferably an alkylene group having up to 4 carbon atoms, y has a value of 0 or 1, and x has a value of from 10 to 1500, preferably 50 to 1200, most preferably 70 to 800. It is most preferred that polydiorganosiloxane (A) is an α,ω-vinyldimethylsiloxy polydimethylsiloxane polymer having a viscosity of from 50 to 250,000 mPa.s at 25° C., more preferably 100 to 100,000 mPa.s, most preferably 250 to 60,000 mPa.s.

The cross-linking organosilicon material (B) is an organosilicon compound, which is capable of reacting with component (A) above. Suitable organosilicon compounds are well known in the art. They may vary from viscous materials to freely flowing liquids. Preferred materials have a viscosity of not greater than 500 mPa.s at 25° C., more preferably 2 to 55 mPa.s at 25° C. They may be monomers, homopolymers, copolymers or mixtures thereof which comprise at least one unit of the general formula $R^1_a R^5_b SiO_{4-a-b/2}$ wherein $R^1$, a and b are as defined above and $R^5$ is a hydrogen atom, a hydroxyl or an alkoxy group.

Cross-linking organosilicon materials (B) are preferably selected from silanes, low molecular weight organosilicon resins and short chain organosiloxane polymers. The cross-linking material (B) has at least 3 silicon-bonded substituents $R^5$ which are capable of reacting with the silicon-bonded group $R^2$ of the organopolysiloxane polymer (A) described above. Where the group $R^2$ is a hydroxyl or alkoxy group, it is preferred that the reactive substituents on the cross-linking organosilicon compound are either alkoxy groups or hydroxyl groups, allowing the condensation to take place between the two components according to the general reaction scheme (IV) or (V), wherein R* denotes an alkyl group

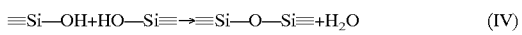
(IV)

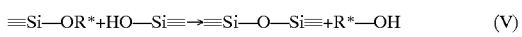
(V)

Where the group $R^2$ of organopolysiloxane (A) is hydroxyl or an aliphatically unsaturated hydrocarbon group, the reactive substituents $R^5$ on the cross-linking organosilicon material are hydrogen atoms, allowing either condensation or addition reaction between the cross-linking organosilicon material and the organopolysiloxane polymer (A), according to the general reaction scheme (VI) or (VII), wherein $R^4$ is a divalent hydrocarbon group as defined above and y is 0 or 1.

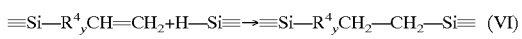
(VI)

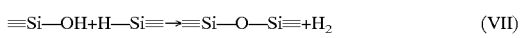
(VII)

Suitable silanes which may serve as cross-linking organosilicon compounds include alkyltrialkoxy silane, e.g. methyltrimethoxy silane, ethyltrimethoxy silane, methyltriethoxy silane or methyltrihydrosilane. Suitable organosilicon resin compounds include organosilicon resins consisting mainly of tetrafunctional siloxane units of the formula $SiO_{4/2}$ and monofunctional units $R_a R^5_b SiO_{1/2}$, wherein R, $R^5$, a and b are as defined above. Suitable short chain organosiloxane polymers include short chain polyorgano siloxanes having at least 3 silicon-bonded alkoxy, hydroxyl or hydrogen atoms per molecule, e.g. trimethyl siloxane end-blocked polymethylhydro siloxane having up to 20 carbon atoms, tetramethyl cyclotetrasiloxane and silanol end-blocked dimethylsiloxane-methylsilanol copolymers.

Organosilicon component (B) is preferably a short chain polyorganosiloxane having at least 3 silicon-bonded hydrogen atoms, preferably having a silicon-bonded hydrogen atom on at least 40% of, more preferably on the majority of silicon atoms in the molecule. Particularly preferred are organosilicon compounds which are substantially linear or cyclic compounds. However, small amounts of trifunctional or tetrafunctional siloxane units may also be present.

Preferred compounds for (B) are organosilicon compounds having the general formulae (VIII) or (IX)

(VIII)

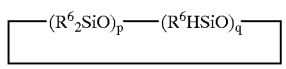

(IX)

wherein $R^6$ denotes an alkyl or aryl group having up to 10 carbon atoms, $R^7$ is a group $R^6$ or a hydrogen atom, p has a value of from 0 to 20, q has a value of from 1 to 70, and there are at least 3 silicon-bonded hydrogen atoms present per molecule. It is not important if the silicon-bonded hydrogen atoms are on terminal silicon atoms for linear siloxane compounds (VII) or not. It is preferred that $R^6$ denotes a lower alkyl group having no more than 3 carbon atoms, most preferably a methyl group. $R^7$ preferably denotes an $R^6$ group, provided at least 3 of them are hydrogen atoms. Most preferably p and q have similar values or p=0 and q has a value of from 6 to 70, more preferably 20 to 60, or where cyclic organosilicon materials are used, from 3 to 8. The cross-linking component may comprise a mixture of several organosilicon compounds as described.

The catalyst (C) may be any compound which catalyses the reaction between components (A) and (B) above. Where the reaction is a condensation reaction, the catalyst may be any of the known condensation catalysts, e.g. acids, including sulphuric acid, hydrochloric acid, Lewis acids, bases, e.g. sodium hydroxide, potassium hydroxide, tetramethylammonium hydroxide, tetrabutylphosphonium silanolate and amines, catalysts based on tin or titanium, e.g. dialkyltin dicarboxylic acids and tetraalkyl titanates. Particularly useful organotitanium compounds have organic groups attached to titanium through a titanium-oxygen-carbon linkage. The main types are ortho-esters, i.e. alcoholates and acylates in which the organic group is derived from a carboxylic acid. An organotitanium catalyst may also contain both types of the aforementioned groups attached to the same titanium atom. Operative organotitanium catalysts thus include those of the formula Ti(OR$^8$)4 wherein $R^8$ is alkyl, alkoxyalkyl or acyl, for example tetraisopropyl titanate, tetramethoxyethoxytitanate and di-isopropyl diacetoxytitanate. The preferred organo-titanium catalysts for use in this invention are the chelated or partially chelated titanium compounds. These materials are produced, for example by reacting an alcoholate as referred to above with an α- or β-diketone or a derivative thereof.

For the more preferred addition reaction systems for use in the present invention, suitable catalysts include Group VIII metal-based or noble metal catalysts e.g. rhodium, ruthenium, palladium, osmium, irridium or platinum containing catalysts. Platinum-based catalysts are particularly preferred and may take any of the known forms, ranging from platinum deposited onto carriers, for example powdered charcoal, to platinic chloride, salts of platinum, chloroplatinic acids and encapsulated forms thereof. A preferred form of platinum catalyst is chloroplatinic acid, platinum acetylacetonate, complexes of platinous halides with unsaturated compounds such as ethylene, propylene, organovinylsiloxanes, and styrene, hexamethyldiplatinum, PtCl$_2$, PtCl$_3$, PtCl$_4$, and Pt(CN)$_3$. The preferred platinum catalyst is a form of chloroplatinic acid, either as the commonly available hexa-hydrate form or in its anhydrous form, as taught in U.S. Pat. No. 2,823,218. Another particularly useful catalyst is the composition that is obtained when chloroplatinic acid is reacted with an aliphatically unsaturated organosilicon compound such as divinyltetramethyldisiloxane, as disclosed in U.S. Pat. No. 3,419,593. Proportions of from 0.1 to 0.5 parts by weight of such complex as catalyst per 100 parts by weight of component (A), having aliphatically unsaturated substituents, are preferred. It is preferred that the platinum-based catalyst (C) is employed in an amount giving from 2 to 100 ppm by weight of platinum metal based on the total weight of the composition, more preferably 5 to 50 ppm.

A first filler, Component D, is also provided in the elastomer-forming composition. This filler is a reinforcing filler, which is preferably hydrophobic. Examples of suitable fillers include silica, titania, ground quartz, calcium carbonate, alumino silicates, organosilicon resins. Preferred are silica fillers, most preferably fumed or precipitated silica fillers, as they have the best reinforcing properties. Silicone resins may also be used e.g. a MQ resin, i.e. a resin consisting of monovalent siloxane units M and quadrivalent siloxane units Q and is preferably a resin consisting essentially of M units $R^2R^1{}_2SiO_{1/2}$ and $R^1{}_3SiO^{1/2}$ and Q units $SiO_{4/2}$ in which $R^1$ and $R^2$ are as defined above. Preferably $R^2$ is a vinyl group, there being no more than 10% by weight of vinyl groups per molecule more preferably 1 to 5% by weight of vinyl groups per molecule. The resin may be in solid or liquid form although we prefer the ratio of the units M to the units Q to be such that the resin is a solid at ambient temperature and pressure. The average particle size of these fillers may be such that the diameter ranges from 0.1 to 20 μm, preferably from 0.2 to 5 μm, most preferably 0.4 to 2.5 μm.

The surface of the filler particles is preferably rendered hydrophobic in order to make the filer more compatible with the compositions used in the present invention. Rendering the filler particles hydrophobic may be done either prior to or after dispersing the filler particles in the siloxane component. This can be effected by pre-treatment of the filler particles with fatty acids, reactive silanes or reactive siloxanes. Examples of suitable hydrophobing agents include stearic acid, dimethyldichlorosilane, trimethylchlorosilane, hexamethyldisilazane, hydroxyl end-blocked or methyl end-blocked polydimethylsiloxanes, siloxane resins or mixtures of two or more of these. Other hydrophobing agents may also be used, but the above exemplified materials are the most effective. Fillers which have already been treated with such compounds are commercially available from a number of sources. Alternatively, the surface of the filler may be rendered hydrophobic in situ, i.e. after the filler has been dispersed in the organopolysiloxane polymer material. This may be effected by adding to the polysiloxane component prior to, during or after the dispersion of the filler, an appropriate amount of a hydrophobing agent of the kind described above as reactive silanes or siloxanes, and heating the mixture sufficiently to cause reaction, e.g. to a temperature of at least 40° C. The quantity of hydrophobing agent to be employed will depend for example on the nature of the agent and of the filler, and will be evident or ascertainable by those skilled in the art. Sufficient hydrophobic agent should be employed to endow the filler with at least a discernible degree of hydrophobicity.

A second filler (E) is also present in the elastomer forming compositions for use in the coating of textile fabrics according to this invention. The second filler is of substantially laminar form. This means that the filler is a material where the dimensions of the particles are such that the average length and width of the particles is significantly larger that its average height. This will give the particles a laminar or plate-like shape. The width and length of the particles is preferably at least ten times greater than the height of the particles, more preferably 100 times or more. Suitable particles of the laminar fillers have an average diameter of from 5 to 500 µm, and a height or thickness of 1 to 100 Ångstrom per layer. The actual particles very often consist of a number of layers agglomerated together, which may result in the particles having a seemingly greater height or thickness. However, these particles should still have a height or thickness which is sufficiently smaller than the width and length to result in a laminar particle. Several particles can be agglomerated by physical forces into smaller or larger clusters. The dimensional conditions outlined above, however, apply not to these larger agglomerates, but to the particles themselves. Examples of suitable second fillers are philosilicates, metal flakes, expanded graphite, laminar quartz, zeolites, clays, micas and laminar graphite. It is particularly preferred that the laminar filler is selected from laminar or layer silicates, especially from pyrophillite, talc, micas, vermiculites and smectites.

Although it is preferred that the laminar filler is hydrophobic in nature, as this improves its compatibility with silicone-based materials, it is not required that the filler is wholly hydrophobic. Indeed some fillers, e.g. talc, are known to have some hydrophobic and some hydrophilic sites. Making laminar fillers hydrophobic, where required, may be done using the same methods as those described above for the first reinforcing filler.

The elastomer-forming silicone based composition may comprise components (A) to (E) in any amount, provided they result, upon curing, in an elastomeric material with acceptable properties. Typical formulation details for silicone-based elastomer forming compositions are known in the art, and are applicable here, with the proviso that sufficient of filler (E) is introduced to fulfil the criteria given above. Preferably suitable elastomer-forming compositions comprise 100 parts by weight of organopolysiloxane polymer (A), sufficient of cross-linking organosilicon material (B) to give a molar ratio of Si-bonded reactive groups in (B) to silicon-bonded groups R in (A) of from 1/2 to 10/1, more preferably from 1.1/1 to 6/1, sufficient of catalyst (C) to ensure the reaction between the silicon-bonded groups R of compound (A) and the silicon-bonded reactive group of compound (B) can proceed, from 5 to 25 parts of the first filler (D), and at least 10 parts by weight of the second filler (E), preferably at least 20 parts by weight, most preferably from 20 to 50 parts by weight.

As mentioned above, it is preferred that the elastomer-forming compositions are based on organosilicon compounds which cure via the addition reaction, most preferably via alkenyl groups present in component (A) and silicon-bonded hydrogen atoms in component (B). The ratio of the components (A) and (B) in such preferred elastomer-forming compositions are not critical, although it is preferred that the ratio of silicon-bonded hydrogen atoms to alkenyl groups would be from 1.1/1 to 6/1, more preferably from 2/1 to 5/1, most preferably from 3.2/1 to 4.5/1. Such higher ratios help to improve the adhesion of the elastomer forming composition to the substrate. Where other components are included in the composition, as will be discussed below, it is preferred that the ratio of silicon-bonded hydrogen atoms to alkenyl groups in the total composition is as indicated hereinabove.

An elastomer-forming silicone based composition for use in a method according to the invention may be provided in one part although it is preferred to provide a composition according to the invention in two or more parts, most preferably two parts. A two-part composition may then be mixed prior to use. It is important to store the components in a two or more parts composition in the correct fashion. They may be formulated in a number of ways provided that the cross-linking organosilicon compound, e.g. the organohydrogensiloxane and the catalyst compound (C), e.g. the noble metal catalyst of the preferred composition, are stored separately. A preferred method of storing a preferred two part composition comprises storing in one part of the composition at least some of organopolysiloxane compound (A), catalyst (C) and optionally all or part of the fillers (D) and (E) and in a second part the cross-linking organosilicon material, together with the remainder of Components (A), (D) and (E). The two parts combine the reactants in a way which permits mixing the two parts in a suitable weight ratio, e.g. 1/1 or 10/1 or 1/10.

Elastomer-forming silicone-based compositions, suitable for use in the present invention, when mixed may have a viscosity appropriate to application machinery and textiles to be coated, generally in the range 2 Pa.s to 200 Pa.s at 25° C. Preferred materials have a viscosity in the range 20 to 120 Pa.s at 25° C. and cure within 1 to 4 minutes at a temperature from 120° C. to 180° C. to provide elastomeric materials. Preferred compositions according to the invention typically remain at workable viscosities for at least 24 hours when stored at temperatures up to 40° C.

An elastomer forming silicone-based composition for use in the invention may comprise additional ingredients, including chain extenders, dyes, adhesion promoters, colorants, pigments, viscosity modifiers, bath-life extenders and flexibilisers, cure inhibitors, flame retardants, antioxidants and catalyst boosters. The preferred compositions, based on a curing mechanism via addition reaction, comprise a addition catalyst inhibitor, e.g. platinum catalyst inhibitor. These are known in the art and include, for example, acetylenic alcohols, dialkylmaleates, primary alcohols or mixtures thereof. A platinum catalyst inhibitor is present in a curable coating composition in a proportion sufficient to ensure that the coating composition cures in not less than 30 seconds at 150° C. If the inhibitor concentration is too low then the coating composition may fail to adhere to a substrate and if too high the composition may fail to cure quickly enough.

Adhesion promoting additives are also optional ingredients, and may be e.g. epoxy-substituted alkoxysilane and an alkenyl functional silanol terminated organopolysiloxane. The epoxy substituted alkoxysilanes are well known in the art and numerous silanes of this type are described, for example, in U.S. Pat. No. 3,455,877. The alkenyl-functional silanol-terminated organopolysiloxane adhesion promoting additive is typically present in an elastomer-forming composition for use in the present invention in an amount which is 0.1% to 3% by weight of the total weight of the curable coating composition. These materials are more fully described in U.S. Pat. No. 4,082,726.

Other suitable additives, are those which e.g. enhance the efficiency of an adhesion promoting additive, e.g. a metal chelate compound. Any metal chelate would be suitable which is compatible with the composition. Suitable metal chelates include acetyl acetonates e.g. triacetyl-acetonates of aluminium, tetra acetylacetonates of zirconium and triacetylacetonates of iron. Aluminium chelates are preferred, especially aluminium acetyl-acetonate. Typical amounts of chelates used are 0.01 to about 5 parts by weight, preferably about 0.1 to 0.3 part by weight per 100 parts of the composition.

Another suitable additional component is a chain-extender, which will improve the elongation of the elastomeric coating. Chain extenders must be used in moderation, as they may also affect the physical properties of the elastomer formed. Examples of chain-extenders for the preferred compositions which cure via addition reaction, are polyorganosiloxane having diorganosiloxane units and hydrodiorgano siloxane end-blocking units, preferably having a viscosity in the range of from 5 to 100 mPa.s at 25° C.

The invention provides in another of its aspects a method of coating a textile which comprises applying thereto an elastomer-forming composition suitable for use in the first aspect of the invention and bringing about curing of the applied composition.

The composition may be applied according to known techniques to the textile fabric substrates. These include spraying, coating by knife-over-roller, coating by knife-over-air, padding and screen-printing. It is preferred that the composition is applied to a coat-weight prior to curing of at least 20 g/m$^2$. Preferably the coating thickness of the first layer is from 25 to 100 g/m$^2$, more preferably 30 to 60 g/m$^2$. In order to make the compositions easily applicable to the textile fabric, it is preferred that the viscosity of the composition is from 20,000 to 300,000 mPa.s.

Application to the textile fabric of the elastomer-forming composition may take place under normal conditions. Preferably of course the conditions are sufficiently clean to avoid entrapment of foreign bodies during the application. The textile fabric is preferably scoured prior to application, in order to ensure good adhesion of the composition. It is however possible, and also covered by the scope of this invention that more than one layer of an elastomer-forming silicone based composition is applied to a textile fabric. The elastomer-forming composition described as suitable for use in the present invention may used to coat the textile fabric directly as a first coat, or indirectly by being coated on an already coated textile fabric. Where more than one layer of an elastomer-forming composition is provided, each layer may be provided by the composition described as suitable for use in the present invention. Preferably however, only one layer of an elastomer-forming silicone-based coating composition is applied to the textile fabric. It is also possible to apply onto the composition a further coating or, even more preferably, an additional textile fabric, whether woven or non-woven, to improve the strength and/or the feel of the fabric.

Curing conditions for suitable elastomer-forming compositions will depend on the exact nature of the elastomer-forming composition used, but are preferably at elevated temperatures over a period which will vary depending on the actual temperature used. Suitable curing conditions for the preferred compositions are 120 to 200° C. for a period of up to 5 minutes.

A method according to this invention is useful for coating textiles and is particularly suitable for coating synthetic textiles, for example polyester and nylon woven fabrics.

Suitable fabrics for use in the present invention are made from synthetic fibres or blends of natural and synthetic fibres, such as polyester, polyimides, polyethylene, polypropylene, polyester-cotton, glass fibre, most preferably polyamide fibres such as Nylon 6,6. They require to be flexible, so they can be folded into relatively small volumes, but need to be sufficiently strong to withstand the deployment at high speed, e.g. under the influence of an explosive charge, and the impact of passengers or other influences when inflated.

Coated textile fabrics according to the first aspect of this invention may be used to make any articles. However, they are particularly suited for use in the manufacture of inflatable safety restraint devices, e.g. airbags, inflatable safety curtains, balloons, chutes. The coated textile fabrics are however not limited to use in such applications, but may also be used e.g. for the manufacture of architectural fabric structures and geotextiles.

Textile fabrics coated with elastomer-forming compositions according to the invention have potentially numerous advantages. The coating composition is able to cure and at the same time rapidly develop an adhesive bond to a variety of textile substrates, in particular to certain synthetic textiles, for example polyesters and nylons. This is particularly true where the composition has the appropriate ratio of silicon-bonded hydrogen atoms to alkenyl groups, as is explained above. Coated textile fabrics according to the invention exhibit good physical properties. They tend to have an improved non-tacky finish, which is dry and smooth to the touch, giving a lower friction coefficient. They generally give better properties at lower coat weights than equivalent prior art fabrics, e.g. with regard to adhesion and smoothness, especially when applied by a higher shear method, such as knife-over-air coating. Because of the presence of the two types of fillers, it has also been found that the coated fabric according to the invention is mostly less permeable to gas than prior art coatings at equivalent coat-weight. This also means that textile fabrics coated with multiple coats as in the prior art may be replaced by fabrics with less coats or even with a single coat The coated fabrics give often an improved resistance to burning and protect the underlying fabric better, both against abrasion and against the impact of hot particles, especially if the second filler is one of the hydrated silicate type. Coated fabrics may also provide improved soil release.

There now follows a description of examples which serve to illustrate the invention. Parts and percentages are given in weight, unless otherwise stated and viscosity is dynamic viscosity at 25° C.

EXAMPLES

A first composition (Comp 1) was prepared by mixing together 70 parts of an α,ω, vinyldimethylsiloxane end-blocked polydimethylsiloxane having a viscosity of about 2 Pa.s, 30 parts of a fumed silica which had its surface made hydrophobic and 0.002 parts by weight of a platinum based catalyst. Comp 1 had a viscosity of 100 Pa.s.

A second composition (Comp 2) was prepared, containing 64 parts by weight of an α,ω, vinyldimethyl-siloxane end-blocked polydimethylsiloxane having a viscosity of 2 Pa.s, 26 parts by weight of a fumed silica which had its surface made hydrophobic, 4 parts by weight of an methylhydrosiloxane dimethylsiloxane copolymer having trimethylsiloxane end-blocking units, at least 3 silicon-bonded hydrogen atoms per molecule and a viscosity of about 5 mPa.s and 5 parts by weight of a dimethylsiloxane having dimethylhydrosiloxane end-blocking units and a viscosity of about 10 mPa.s. Comp 2 had a viscosity of 100 Pa.s.

A third composition (Comp 3) was prepared containing 55 parts of a mixture of two α,ω, vinyldimethylsiloxane end-blocked polydimethylsiloxanes having a viscosity of about 55 Pa.s and 2.5 Pa.s respectively, 25 parts of a calcium carbonate which had its surface made hydrophobic, 0.002 parts by weight of a platinum based catalyst, and 19 parts of alumina hydrate. Comp 3 had a viscosity of 35 Pa.s.

A fourth composition (Comp 4) was prepared by mixing together 85 parts of an α,ω, vinyldimethylsiloxane end-blocked polydimethylsiloxane having a viscosity of about 2.5 Pa.s, 14 parts of a methylhydrogensiloxane dimethylsiloxane copolymer having trimethylsiloxane end-blocking units, at least 3 silicon-bonded hydrogen atoms per molecule and a viscosity of about 30 mPa.s and 0.5 parts of a cyclohexanol inhibitor. Comp 4 had a viscosity of 1.6 Pa.s.

A fifth composition (Comp 5) was prepared containing 60 parts of an α,ω, vinyldimethylsiloxane end-blocked polydimethylsiloxanes having a viscosity of about 2.1 Pa.s, 40 parts of a fumed silica which had its surface made hydrophobic and 0.002 parts by weight of a platinum based catalyst. Comp 5 had a viscosity of 100 Pa.s.

A sixth composition (Comp 6) was prepared by mixing together 70 parts of an α,ω, vinyldimethylsiloxane end-blocked polydimethylsiloxane having a viscosity of about 2.1 Pa.s, 26 parts of a methylhydrogensiloxane dimethylsiloxane copolymer having trimethylsiloxane end-blocking units, at least 3 silicon-bonded hydrogen atoms per molecule and a viscosity of about 5 mPa.s and 0.5 parts of a cyclohexanol inhibitor. Comp 6 had a viscosity of 0.5 Pa.s.

A dimethyl methylhydrogen siloxane copolymer having a viscosity of about 5 mPa.s at 25° C. is indicated as Comp 7.

A comparative elastomer-forming composition (C) was prepared by mixing 5 parts of a first composition comprising 64 parts of a 70/30 mixture of a dimethylvinylsiloxy-terminated polydimethylsiloxane and hydrophobic silica, 26 parts of ground quartz, 4 parts of calcium carbonate and a catalytic amount of a platinum based catalyst and 1 part of a second composition comprising 50 parts of a 70/30 mixture of a dimethylvinylsiloxy-terminated polydimethylsiloxane and hydrophobic silica, 46 parts of a dimethylsiloxane methylhydrogen siloxane copolymer having silicon-bonded hydrogen atoms on about 50% of the silicon atoms.

The above compositions were used to prepare a number of elastomer-forming silicone-based example (EC) and comparative (CC) compositions, details of which are given in Table I below, each ingredient, amounts of which are indicated in parts by weight. Filler A is talc, filler B is mica, filler C is dicalite, filler D is flake aluminium, filler E is vermiculite.

C. The coated fabric was then allowed to cool to room temperature before any tests were carried out. Coating was also carried out at different settings to give a variety of coat weights, from 40 to 200 g/m$^2$.

Friction (dynamic and static) measurements were made on several coated fabrics according to DIN 53 375, and results are given in Table II (coat weight given in brackets in g/m$^2$). It was found that the direction of dragging the sled ad no substantial effect on the coefficients of friction.

TABLE II

| Coating composition | Dynamic Friction coefficient | Static Friction coefficient |
|---|---|---|
| CC 2 | 1 (60) | 1 (60) |
| CC 2 | 1.4 (70) | 1.7 (70) |
| CC 2 | 1.6 (80) | 1.7 (80) |
| CC 2 | 1.8 (190) | 1.8 (190) |
| EC 1 | 0.6 (40) | 0.6 (40) |
| EC 1 | 0.7 (70) | 0.8 (70) |
| EC 1 | 0.9 (125) | 1 (125) |
| EC 1 | 0.9 (190) | 0.9 (190) |
| CC 1 | 1.35 (69) | 1.68 (60) |
| EC 2 | 0.8 (100) | 0.9 (100) |
| EC 6 | 1.22 (90) | 1.42 (90) |
| CC 3 | 0.56 (65) | 0.66 (65) |
| EC 3 | 0.46 (95) | 0.46 (95) |
| CC 5 | 1.12 (60) | 1.22 (60) |
| EC 4 | 0.66 (90) | 0.66 (90) |
| EC 8 | 0.82 (90) | 0.82 (90) |
| EC 9 | 0.92 (60) | 0.97 (90) |

CC 2, EC 1, EC 13 and EC 14 were tested for physical properties of the coating composition, cured to an elastomer, but not coated on a textile fabric. Durometer hardness, Tensile strength, tear strength and elongation at break were measured using standard tests. The results showed an dramatic improvement in Shore hardness with increased amount of filler A, and a reduction in the other three properties. However, the reduction still leaves acceptable values for most applications.

TABLE I

| Example Number | Comp 1 amount | Comp 2 amount | Comp 3 amount | Comp 4 amount | Comp 5 amount | Comp 6 amount | Comp 7 amount | Filler type | Filler amount |
|---|---|---|---|---|---|---|---|---|---|
| EC 1 | 10 | 10 | | | | | 0.8 | A | 11.63 |
| EC 2 | 10 | 10 | | | | | | A | 11.63 |
| EC 3 | | | 10 | 2 | | | | A | 6.8 |
| EC 4 | | | | | 10 | 2 | | A | 6.8 |
| EC 5 | 10 | 10 | | | | | 0.8 | B | 11.63 |
| EC 6 | 10 | 10 | | | | | | B | 11.63 |
| EC 7 | | | 10 | 2 | | | | B | 6.8 |
| EC 8 | | | | | 10 | 2 | | B | 6.8 |
| EC 9 | | | | | 10 | 2 | | C | 6.8 |
| EC 10 | | | | | 10 | 2 | | D | 6.8 |
| EC 11 | | | | | 10 | 2 | | E | 6.8 |
| EC 12 | 10 | 10 | | | | | | E | 11.63 |
| EC 13 | 10 | 10 | | | | | 0.8 | A | 8.4 |
| EC 14 | 10 | 10 | | | | | 0.8 | A | 7.4 |
| CC 1 | 10 | 10 | | | | | | — | — |
| CC 2 | 10 | 10 | | | | | 0.8 | — | — |
| CC 3 | | | 10 | 2 | | | | — | — |
| CC 4 | | | | | 10 | 1 | 0.8 | — | — |
| CC 5 | | | | | 10 | 2 | | — | — |

The example and comparative compositions were coated onto a polyamide fabric of 470 Dtex on both sides of the fabric by a knife over steel roller technique with a zero gap setting. The machine settings were arranged with composition CC 1 to achieve a coat weight of 50–60 g/m$^2$, and then kept constant for all other compositions. The coating was followed by heating the coated fabric for 2 minutes at 165°

CC 2, EC 1, EC 13 and EC 14 were also tested for the limiting Oxygen Index, according to ASTM D 2863-74. An increase of index from 23% to 29% was observed with increasing level of filler A.

Three strips of 50 mm by 5 mm of the nylon fabric were then tested for their tendency to burn when subjected to a flame. A first strip was left uncoated (Strip 1), a second one was taken from EC 1 with a coat weight of 85 g/m² (Strip 2) and a third one was taken from CC 1 at a coat weight of 91 g/m² (Strip 3). Each strip was then placed in contact with the tip of a 2.54 cm flame from a butane gas lighter for 3 seconds. Strip 1 burned vigorously, was completely consumed. Strip 2 did not catch fire, although some scorch marks were visible. Strip 3 caught fire and 40 mm of the strip burned up. Squares 1, 2 and 3, measuring 50×50 mm were then prepared from the same materials, and were exposed for 3 seconds to the tip of a 3.8 cm flame of a butane blow torch, aimed at the centre (coated side for Squares 2 and 3). Square 1 was holed quickly and burned vigorously around the edges of the hole. Square 2 saw the fabric at the reverse side (not exposed to the flame, but uncoated) melt, whereas the coating remains intact and flexible, although slightly altered in appearance. Square 3 saw a hole appear and the edges of the hole slowly burned.

That which is claimed is:

1. A textile fabric which has been coated with an elastomer-forming silicone-based composition, comprising
   A. an organopolysiloxane polymer having a siloxane backbone being end-blocked with at least two silicon-bonded groups R, wherein R is selected from the group consisting of olefinically unsaturated hydrocarbon substituents, alkoxy groups and hydroxyl groups,
   B. a cross-linking organosilicon material having at least 3 silicon-bonded reactive groups, capable of reacting with organopolysiloxane polymer A,
   C. a catalyst capable of promoting the reaction between the silicon-bonded groups R of compound A and the silicon-bonded reactive group of compound B,
   D. a first filler which is a reinforcing filler for the silicone-based composition
   E. at least 2 parts by weight for every part of the first filler, of a second filler, which has a substantially laminar form.

2. A textile fabric according to claim 1, wherein organopolysiloxane polymer (A) has units of the general formula $R^1_a R^2_b SiO_{4-a-b/2}$ (I), wherein $R^1$ is a monovalent hydrocarbon group having up to 18 carbon atoms, $R^2$ is selected from the group consistin of monovalent hydrocarbon groups, monovalent hydrocarbonoxy groups and hydroxyl groups, a and b have a value of from 0 to 3, the sum of a+b being no more than 3.

3. A textile fabric according to claim 2, wherein the organopolysiloxane polymer (A) has the general structure II

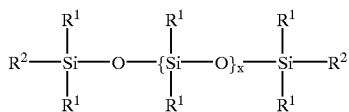

(II)

wherein $R^1$ is a monovalent hydrocarbon group having up to 18 carbon atoms, $R^2$ is selected from the group consisting of monovalent hydrocarbon groups, monovalent hydrocarbonoxy groups and hydroxyl groups, and wherein x is an integer having a value of from 10 to 1500.

4. A textile fabric according to claim 3, wherein organopolysiloxane polymer (A) has at least two silicon-bonded alkenyl groups per molecule.

5. A textile fabric according to claim 4, wherein organopolysiloxane (A) is a polydiorganosiloxane having the general formula (III),

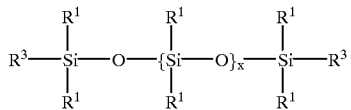

(III)

where $R^1$ is a monovalent hydrocarbon group having up to 18 carbon atoms, $R^3$ denotes an alkenyl group having up to 8 carbon atoms, with the formula $-R^4_y-CH=CH_2$, where $R^4$ denotes a divalent hydrocarbon group having up to 6 carbon atoms, y has a value of 0 or 1, and x has a value of from 10 to 1500.

6. A textile fabric according to claim 1, where the cross-linking organosilicon material (B) comprises at least one unit of the general formula $R^1_a R^5_b SiO_{4-a-b/2}$ wherein $R^1$ is a monovalent hydrocarbon group having up to 18 carbon atoms, a and b have a value of from 0 to 3, provided a+b is less than or equal to 3 and $R^5$ is selected from the group consisting of hydrogen, a hydroxyl group and an alkoxy group.

7. A textile fabric according to claim 6 wherein organosilicon material (B) is selected from the group consisting of compounds of the general formula (VIII)

$$R^7 R^6_2 SiO(R^6_2 SiO)_p (R^6 HSiO)_q SiR^6_2 R^7 \quad \text{(VIII)}$$

and compounds of the general formula (IX)

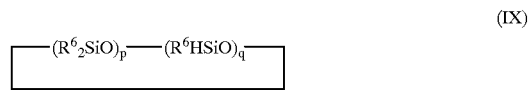

(IX)

wherein $R^6$ is selected from the group consisting of alkyl groups having up to 10 carbon atoms and aryl group having up to 10 carbon atoms, $R^7$ is selected from the group consisting of hydrogen, alkyl groups having up to 10 carbon atoms and aryl group having up to 10 carbon atoms, p has a value of from 0 to 20, q has a value of from 1 to 70, provided there are at least 3 silicon-bonded hydrogen atoms present per molecule.

8. A textile fabric according to claim 1, wherein catalyst (C) is a Group VIII metal-based catalyst selected from the group consisting of compounds and complexes based on rhodium, on ruthenium, on palladium, on osmium, on irridium and on platinum.

9. A textile fabric according to claim 1, wherein the first filler (D) is selected from the group consisting of silica, titania, ground quartz, calcium carbonate, alumino silicates and organosilicon resins, and has an average particle size of from 0.1 to 20 μm.

10. A textile fabric according to claim 9, wherein the surface of the first filler is made hydrophobic.

11. A textile fabric according to claim 1, wherein the width and length of the second filler (E) particles is at least ten times greater than the height of these filler particles.

12. A textile fabric according to claim 1, wherein the laminar fillers (E) have an average diameter of from 5 to 500 μm, and a height or thickness of 1 to 100 Ångstrom.

13. A textile fabric according to claim 1, wherein filler (E) is selected from the group consisting of philosilicates, laminar quartz, metal flakes, expanded graphite, zeolites, clays, micas, laminar graphite, laminar silicates, pyrophillite, talc, mica, vermiculite and smectite.

14. A textile fabric according to claim 1, wherein the fabric is selected from the group consisting of fabric made from synthetic fibres, fabric made from a blend of natural and synthetic fibres, fabric made from polyester, fabric made from polyimides, fabric made from polyethylene, fabric made from polypropylene, fabric made from polyester-cotton, fabric made from glass fibre and fabric made from polyamide fibre.

15. A process for making a textile fabric, which comprises applying to a textile fabric an elastomer-forming silicone-based composition, comprising A. an organopolysiloxane polymer having a siloxane backbone being end-blocked with at least two silicon-bonded groups R, wherein R is selected from the group consisting of olefinically unsaturated hydrocarbon substituents, alkoxy groups and hydroxyl groups, B. a cross-linking organosilicon material having at least 3 silicon-bonded reactive groups, C. a catalyst capable of promoting the reaction between the silicon-bonded groups R of compound A and the silicon-bonded reactive group of compound B, D. a first filler which is a reinforcing filler for the silicone-based composition E. at least 2 parts by weight for every part of the first filler, of a second filler, which has a substantially laminar form, and allowing the composition to cure to an elastomeric material.

* * * * *